United States Patent Office 3,712,909
Patented Jan. 23, 1973

3,712,909
IMIDAZOLYL-ALKYL-THIOPHOSPHATES AND
THIOPHOSPHONATES
Jozef Drabek, Basel, Switzerland, and Georg Pissiotas,
Loerrach, Germany, assignors to Ciba-Geigy AG, Basel,
Switzerland
No Drawing. Filed July 27, 1971, Ser. No. 166,589
Claims priority, application Switzerland, Aug. 5, 1970,
11,779/70
Int. Cl. C07d 49/36
U.S. Cl. 260—309
9 Claims

ABSTRACT OF THE DISCLOSURE

Compounds of the formula

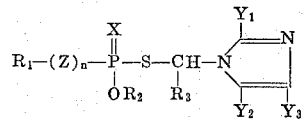

wherein $R_1$ and $R_2$ are each $C_{1-4}$ alkyl, $n$ is 0 or 1, X and Z are each oxygen or sulphur, $R_3$ is hydrogen or methyl and $Y_1$, $Y_2$, or $Y_3$ are each chlorine or bromine are useful for combating insects, phytopathogenic fungi and representatives of the order Acarina.

---

This invention relates to imidazolyl-alkyl-thiophosphates and thiophospshonates, their manufacture and use, as well as pest control agents containing them.

According to the present invention there are provided compounds of the formula

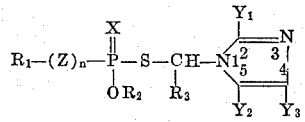

wherein $R_1$ and $R_2$ are each $C_{1-4}$ alkyl
$n$ is 0 or 1
X and Z are each oxygen or sulphur
$R_3$ is hydrogen or methyl, and
$Y_1$, $Y_2$ and $Y_3$ are each chlorine or bromine.

Of particular value are compounds in which $R_1$ and $R_2$ are each methyl, ethyl, n-propyl or isopropyl, $R_3$ is hydrogen, $Y_1$ is chlorine or bromine and $Y_2$ and $Y_3$ represent chlorine or bromine and are identical.

The compounds of Formula I can be made in known fashion by reaction of a compound of formula

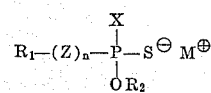

with a compound of formula

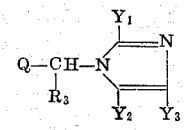

wherein $R_1$, $R_2$, $R_3$, Z, $n$, $Y_1$, $Y_2$ and $Y_3$ have the meanings given above and wherein $M^\oplus$ is an alkali cation or an optionally alkyl-substituted ammonium cation, and Q is chlorine or bromine, with the splitting off of a molecule of MQ.

For example, the reaction may proceed as follows:

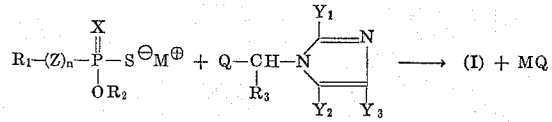

If desired, $Y_1$, $Y_2$ and $Y_3$ can be wholly or partly replaced by hydrogen in the starting materials and can then be converted by suitable halogenation into the halo-substituent.

The starting materials of formula

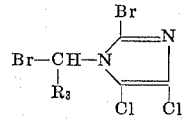

are new compounds. They can be prepared by reacting 2-bromo-4,5-dichloroimidazole with formaldehyde or acetaldehyde and then converting the compound of the formula

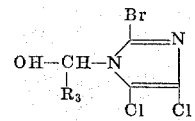

into a compound of Formula IV by means of a brominating agent, preferably thionyl bromide.

The new compounds of Formula I show broad spectrum biocidal activity and can be used to combat all sorts of vegetable and animal pests.

They are very effective against representatives of the class phycomycetes, e.g. phytopathogenic fungi such as Botyrtis and Piricularia, as well as against various other fungal disease promoters in crops, maize, rice, vegetables, fruit and other cultures.

They have particularly satisfactory action against the following fungal types: *Cochliobolus miyabeanus* types, Corticium types, Cerocospora types, *Venturia inaequalis*, *Podosphaera leucotricha*, *Uromyces phaseoli*, Piricularia sp., *Piricularia oryzae*, *Erysiphe cichoracearum*, *Penicillium digitatum*, *Sphaerotheca humuli*, *Diplocarpon rosae*, *Uncinula necator*, *Coccomyces hiemalis*, *Cladosporium carpophilum*, *Erysiphe graminis hordei*, Sclerotinia, *Puccinia recondita*, *P. coronata*, *P. glumarum*, *Puccinia graminis tritici*, *Aspergillus niger*, *Aspergillus terreus*.

This listing does not pretend to be complete.

The active compounds according to the invention or pest control agents containing them also have a fungitoxic action on moulds which attack the plant from the ground up and partly cause trachaeomycoses, such as:

Alternaria
Aphanomyces
Botrytis
Cercosporella
Phoma
Phytophthora
Pythium
Rhizoctonia
Sclerotinia
Fusarium
Helminthosporium
Olpidium
Ophicbolus
Sclerotium
Thielavia
Thielaviopsis
Verticillium Above all, the new phosphorus compounds are suitable for combating insects and representatives of the order Acarina (mites, spidermites, ticks etc.) in all stages of development such as eggs, larvae, nymphs, pupae and adults or imagos. In the various orders and classes of insects, the following types of pest are worthy of particular mention:

Among the Corrodentia, particularly the lice, among Orthoptera the cockroaches, grasshoppers, earwigs, crickets and termites. Among Coleoptera there are wood beetles and bark-beetles, and stored product pests such as yellow mealworm beetles, dermestid beetles and grain weevils; also click beetles and their larvae the wire worms (Elateridae) should be particularly noted.

In the order Rhynchocytes the sucking insects (aphids), bugs and cicadas (leafhoppers) should be mentioned as particular pests. Among Diptera, all types of flies, gnats, midges and mosquitoes should be noted, particularly those which act as disease transfer agents such as Anopheles and Aedes types. Grubs should be noted as representative of Lepidoptera, these being the eating and sapping stage of moths and butterflies; above all, moths such as clothes moths, tortrix moths, leaf roller moths, candle moths and noctuids should be noted.

The order Acarina includes as particular pests the mites, spidermites (Tetranychidae) and the ticks (Ixodidae) classed among the ectoparasites.

Nematode types such as Ditylenchus, Heterodera and Aphelenchoides can also be combated with the compounds of Formula I. This exemplary listing of pests makes no claim to completeness.

Note should also be taken of the favourable warm blooded toxicity of the phosphorus compounds of Formula I and of pest control agents containing such compounds.

The esters of Formula I can be used alone or with suitable carriers or extenders (solvents or solid or liquid diluents) and/or other additives. Such additives may correspond to materials normal in the formulation art such as natural or regenerated mineral materials, dispersing agents, emulsifying agents, wetting agents, adhesives, thickeners, binding and composting agents. Furthermore, other pesticides can be added, e.g. ureas, saturated and unsaturated halocarboxylic acids, halohydrocarbons, carbonates, triazines, nitroalkylphenols, organic phosphorus compounds, quaternary ammonium salts, sulphonic acids, arsenates, arsenites, borates or chlorates.

As examples, there may be noted:

Phosphoric acid derivatives

Bis-O,O-diethylphosphoric anhydride (Tepp)
O,O,O,O-tetrapropyldithiopyrophosphate
Dimethyl(2,2,2-trichloro-1-hydroxyethyl)phosphonate (Trichrorfon)
1,2-dibromo-2,2-dichloroethyldimethylphosphate (Naled)
2,2-dichlorovinyldimethylphosphate (Dichlorvos)
2-methoxycarbamyl-1-methylvinyldimethylphosphate (Mevinphos)
Dimethyl-1-methyl-2-(methylcarbamol) vinylphosphate cis (Monocrotophos)
3-(dimethoxyphosphinyloxy)-N-methyl-N-methoxy-cis-crotonamide
3-(dimethoxyphosphinyloxy)-N,N-dimethyl-cis-crotonamide (Dicrotophos)
2-chloro-2-diethylcarbamoyl-1-methylvinyldimethylphosphate (Phosphamidon)
O,O-diethyl-O-2-(ethylthio)-ethylthiophosphate (Demeton)
O,O-diethyl-S-2-(ethylthio)-ethylthiophosphate
S-ethylthioethyl-O,O-dimethyl-dithiophosphate (Thiometon)
O,O-diethyl-S-ethylmercaptomethyldithiophosphate (Phorate)
O,O-diethyl-S-2-[(ethylthio)ethyl]dithiophosphate (Disulfoton)
O,O-dimethyl-S-2-(ethylsulfinyl)ethylthiophosphate (Oxydemetonmethyl)
O,O-dimethyl-S-(1,2-dicarbethoxyethyl)dithiophosphate (Malathion)
(O,O,O,O-tetraethyl-S,S'-methylene-bis[dithiophosphate] (Ethion)
O-ethyl-S,S-dipropyldithiophosphate
O,O-dimethyl-S-(N-methyl-N-formylcarbamoylmethyl)-dithiophosphate (Formothion)
O,O-dimethyl-S-(N-methylcarbamoylmethyl)dithiophosphate (Dimethoate)
O,O-dimethyl-S-(N-ethylcarbamoylmethyl)dithiophosphate (Ethoate-methyl)
O,O-diethyl-S-(N-isopropylcarbamoylmethyl)-dithiophosphate (Prothoate)
S-N-(1-cyano-1-methylethyl)carbamoylmethyldiethyl-thiolphosphate (Cyanthoate)
S-(2-acetamidoethyl)-O,O-dimethyldithiophosphate
Hexamethylphosphoric acid triamide (Hempa)
O,O-dimethyl-O-p-nitrophenylthiophosphate (Parathion-methyl)
O,O-diethyl-O-p-nitrophenylthiophosphate (Parathion)
O-ethyl-O-p-nitrophenylphenylthiophosphonate (EPN)
O,O-dimethyl-O-(4-nitro-m-tolyl)thiophosphate (Fenitrothion)
O,O-dimethyl-O-(2-chlor-4-nitrophenyl)thiophosphate (Dicapthon)
O,O-dimethyl-O-p-cyanophenylthiophosphate (Cyanox)
O-ethyl-O-p-cyanophenylphenylthiophosphonate
O,O-diethyl-O-2,4-dichlorphenylthiophosphate (Dichlofenthion)
O-2,4-dichlorphenyl-O-methylisopropylamidothio-phosphate
O,O-dimethyl-O-2,4,5-trichlorphenylthiophosphate (Fenchlorphos)
O-ethyl-O-2,4,5-trichlorphenylethylthiophosphonate (Trichloronate)
O,O-dimethyl-O-2,5-dichlor-4-bromphenylthiophosphate (Bromophos)
O,O-diethyl-O-2,5-dichlor-4-bromphenylthiophosphate (Bromophos-aethyl)
O,O-dimethyl-O-(2,5-dichlor-4-iodiphenyl)-thiophosphate (Iodofenphos)
4-tert. butyl-2-chlorphenyl-N-methyl-O-methylamido-phosphate (Crufomat)
Dimethyl-p-(methylthio)phenylphosphate
O,O-dimethyl-O-(3-methyl-4-methylmercaptophenyl) thiophosphate (Fenthion)
Isopropylamino-O-ethyl-O-(4-methylmercapto-3-methylphenyl)phosphate
O,O-diethyl-O-p-[(methylsulfinyl)phenyl]-thiophosphate (Fensulfothion)
O,O-dimethyl-O-p-sulfamidophenylthiophosphate
O-[p-(dimethylsulfamido)phenyl]-O,O-dimethylthiophosphate (Famphur)
O,O,O',O'-tetramethyl-O,O'-thiodi-p-phenylenthiophosphate
O-(p-(p-chlorphenyl)azophenyl)O,O-dimethylthiophosphate (Azothoate)
O-ethyl-S-phenyl-ethyldithiophosphonate
O-ethyl-S-4-chlorphenyl-ethyldithiophosphonate
O-isobutyl-S-p-chlorphenyl-ethyldithiophosphonate
O,O-dimethyl-S-p-chlorphenylthiophosphate
O,O-dimethyl-S-(p-chlorphenylthiomethyl)-dithiophosphate
O,O-diethyl-p-chlorphenylmercaptomethyl-dithiophosphate (carbophenothion)
O,O-diethyl-S-p-chlorphenylthiomethyl-thiophosphate
O,O-dimethyl-S-(carbethoxy-phenylmethyl)dithiophosphate (Phenthoate)
O,O-diethyl-S-(carbofluorethoxy-phenylmethyl)-dithiophosphate
O,O-dimethyl-S-(carboisopropoxy-phenylmethyl)-dithiophosphate
O,O-dimethyl-O-(alpha-methylbenzyl-3-hydroxycrotonyl) phosphate 2-chlor-1-(2,4-dichlorphenyl)vinyl-diethylphosphate (Chlorfenvinphos)
2-chlor-1-(2,4,5-trichlorphenyl)vinyl-dimethylphosphate
O-(2-chlor-1-(2,5-dichlorphenyl)vinyl-O,O-diethylthiophosphate
Phenylglyoxylonitriloxim-O,O-diethylthiophosphate (Phoxim)
O,O-diethyl-O-(3-chloro-4-methyl-2-oxo-2-H-1-benzopyran-7-yl)-thiophosphate (Coumaphos)
O,O-diethyl-7-hydroxy-3,4-tetramethylen-coumarinyl-thiophosphate (Coumithoate)
2,3-p-dioxandithiol-S,S-bis(O,O-diethyldithiophosphate) (Dioxathion)
2-methoxy-4-H-1,3,2-benzodioxaphosphorin-2-sulfide
O,O-diethyl-O-(5-phenyl-3-isooxyzolyl)thiophosphate
S-[(6-chlor-2-oxo-3-benzoaxazolinyl)methyl]O,O-diethyldithiophosphate (Phosalone)
2-(diethoxyphosphinylimino)-4-methyl-1,3-dithiolane
O,O-dimethyl-S-[2-methoxy-1,3,4-thiadiazol-5-(4H)-onyl-(4)-methyl]dithiophosphate
Tris-(2-methyl-1-aziridinyl)-phosphineoxide (Metepa)
O,O-dimethyl-S-phthalimidomethyl-dithiophosphate
S-(2-chlor-1-phthalimidoethyl-O,O-diethyldithiophosphate
N-hydroxynaphthalimido-diethylphosphate
Dimethyl-3,5,6-trichlor-2-pyridylphosphate
O,O-dimethyl-O-(3,5,6-trichlor-2-pyridyl)thiophosphate
O,O-diethyl-O-(3,5,6-trichlor-2-pyridyl)thiophosphate
O,O-diethyl-O-2-pyrazinylthiophosphate (Thionazin)
O,O-diethyl-O-(2-isopropyl-4-methyl-6-pyrimidyl)thiophosphate (Diazinon)
O,O-diethyl-O-(2-chinoxylyl)thiophosphate
O,O-dimethyl-S-(4-oxo-1,2,3-benzotriazin-3(4H)-ylmethyl)-dithiophosphate (Azinphos-methyl)
O,O-diethyl-S-(4-oxo-1,2,3-benzotriazin-3(4H)-ylmethyl)-dithiophosphate (Azinphos-ethyl)
S-[(4,6-diamino-s-triazin-2-yl)methyl]-O,O-dimethyldithiophosphate (Menazon)
S-[2-(ethylsulfonyl)ethyl]dimethylthiolphosphate (Dioxydemeton-S-methyl)
Diethyl-S-[2-(ethylsulfinyl)ethyl]dithiophosphate (Oxydisulfoton)
Bis-O,O-diethylthiophosphoric acid anhydride (Sulfotep)
Dimethyl-1,3-di(carbomethoxy)-1-propen-2-yl-phosphate
Dimethyl-(2,2,2-trichlor-1-butyroyloxyethyl)phosphonate (Butonate)
O,O-dimethyl-O-(2,2-dichlor-1-methoxy-vinyl)phosphate
O,O-dimethyl-O-(3-chlor-4-nitrophenyl)thiophosphate (Chlorthion)
O,O-dimethyl-O (or S)-2-(ethylthioethyl)thiophosphate (Demeton-S-methyl)
Bis-(dimethylamido)fluorophosphate (Dimefox)
2-(O,O-dimethyl-phosphoryl-thiomethyl)-5-methoxy-pyron-4
3,4-dichlorbenzyl-triphenylphosphonium chloride
Dimethyl-N-methoxymethylcarbamoylmethyl-dithiophosphate (Formocarbam)
O,O-diethyl-O-(2,2-dichlor-1-chlorethoxyvinyl)phosphate
O,O-dimethyl-O-(2,2-dichlor-1-chlorethoxyvinyl)phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorphenylthiomethyl)dithiophosphate (Methylcareophenothion)
O,O-dimethyl-S-(ethylthiomethyl)dithiophosphate
Diisopropylaminofluorphosphate (Mipafox)
O,O-dimethyl-S-(morpholinylcarbamoylmethyl)dithiophosphate (Morphothion)
Bismethylamido-phenylphosphate
O,O-dimethyl-S-(benzolsulfonyl)dithiophosphate
O,O-dimethyl-(S and O)-ethylsulfinylethylthiophosphate
O,O-diethyl-O-4-nitrophenylphosphate
O,O-diethyl-S-(2,5-dichlorphenylthiomethyl)dithiophosphate (Phenkapton)
Triethoxy-isopropoxy-bis(thiophosphinyl)disulfide
O,O-diethyl-O-(4-methyl-cumarinyl-7)-thiophosphate (Potasan)
2-methoxy-4H-1,3,2-benzodioxaphosphorin-2-oxide
Octamethylpyrophosphoramide (Schradan)
Bis(dimethoxythiophosphinylsulfido)-phenylmethane
5-amino-bis(dimethylamino)phosphinyl-3-phenyl-1,2,4-triazole (triamiphos)
N-methyl-5-(O,O-dimethylthiolphosphoryl)-3-thiavaleramide (vamidothion)

Carbamic acid derivatives 1-naphthyl-N-methylcarbamate(Carbaryl)
2-butinyl-4-chlorphenylcarbamate
4-dimethylamino-3,5-xylyl-N-methylcarbamate
4-dimethylamino-3-tolyl-N-methylcarbamate (Aminocarb)
4-methylthio-3,5-xylyl-N-methylcarbamate (Methiocarb)
3,4,5-trimethylphenyl-N-methylcarbamate
2-chlorphenyl-N-methylcarbamate(CPMC)
5-chloro-6-oxo-2-norbornan-carbonitril-O-(methylcarbamoyl)-oxime
1-(dimethylcarbamoyl)-5-methyl-3-pyrazolyl-N,N-dimethylcarbamate(Dimetilan)
2,3-dihydro-2,2-dimethyl-7-benzofuranyl-N-methylcarbamate(Carbofuran)
2-methyl-2-methylthio-propionaldehyd-O-(methylcarbamoyl)-oxime(Aldicarb)
8-quinaldyl-N-methylcarbamate and its salts
Methyl 2-isopropyl-4-(methylcarbamoyloxy) carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-Tolyl-N-methylcarbamate
2,3-xylyl-N-methylcarbamate
3-isopropylphenyl-N-methylcarbamate
3-tert.butylphenyl-N-methylcarbamate
3-sec.-butylphenyl-N-methylcarbamate
3-isopropyl-5-methylphenyl-N-methylcarbamate (Promecarb)
3,5-diisopropylphenyl-N-methylcarbamate
2-chlor-5-isopropylphenyl-N-methylcarbamate
2-chlor-4,5-dimethylphenyl-N-methylcarbamate
2-(1,3-dioxolan-2-yl)phenyl-N-methylcarbamate (Dioxacarb)
2-(4,5-dimethyl-1,3-dioxolan-2-yl)phenyl-N-methylcarbamate
2-(1,3-dioxan-2-yl)phenyl-N-methylcarbamate
2-(1,3-dithiolan-2-yl)phenyl-N-methylcarbamate
2-(1,3-dithiolan-2-yl)phenyl-N,N-dimethylcarbamate
2-isopropoxyphenyl-N-methylcarbamate (Propoxur)
2-(2-propinyloxy)phenyl-N-methylcarbamate
3-(2-propionyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate (Allyxicarb)
4-benzothienyl-N-methylcarbamate
2,3-dihydro-2-methyl-7-benzofuranyl-N-methylcarbamate
3-methyl-1-phenylpyrazol-5-yl-N,N-dimethylcarbamate
1-isopropyl-3-methylpyrazol-5-yl-N,N-dimethylcarbamate (Isolan)
2-(N',N'-dimethylcarbamoyl)-3-methylpyrazol-5-yl-N,N-dimethylcarbamate
2-dimethylamino-5,6-dimethylpyrimidin-4-yl-N,N-dimethylcarbamate
3-methyl-4-dimethylaminomethyleniminophenyl-N-methylcarbamate 3-dimethylamino-methyleniminophenyl-N-methyl-
  carbamate
1-methylthio-ethylimino-N-methylcarbamate
  (Methoxyl)
2-methylcarbamoyloxyimino-1,3-dithiolane
5-methyl-2-methylcarbamoyloximino-1,3-oxathiolane
2-(1-methoxy-2-propoxy)phenyl-N-methylcarbamate
2-(1-butin-3-yl-oxy)phenyl-N-methylcarbamate
3-methyl-4-(dimethylamino-methylmercapto-methylen-
  imino)phenyl-N-methylcarbamate
1,3-bis(carbamoylthio)-2-(N,N-dimethylamino)-
  propane hydrochloride
5,5-dimethylhydroresorcinoldimethylcarbamate
2-[proparglyethylamino]-phenyl-N-methylcarbamate
2-[proparglymethylamino]-phenyl-N-methylcarbamate
2-[diproparglyamino]-phenyl-N-methylcarbamate
3-methyl-4-[dipropargylamino]-phenyl-N-methyl-
  carbamate
3,5-dimethyl-4-[dipropargylamino]-phenyl-N-
  methylcarbamate
2-[allyl-isopropylamino]-phenyl-N-methylcarbamate
3-[allyl-isopropylamino]-phenyl-N-methylcarbamate Chlorinated hydrocarbons γ-Hexachlorocyclohexane[Gamma BHC; Lindan; γ
  HCH]
1,2,4,5,6,7,8,8-octachloro-3α,4,7,7α'-tetrahydro-4,7-
  methyleneindane [Chlordane]
1,4,5,6,7,8,8-heptachloro-3α,4,7,7α-tetrahydro-
  4,7-methyleneindane [Heptachlor]
1,2,3,4,10,10-hexachlor-1,4,4α,5,8,8α-hexahydroendo-
  1,4-exo-5,8-dimethanonaphthaline [Aldrin]
1,2,3,4,10,10-hexachlor-6,7-epoxy-1,4,4α,5,6,7,8,8α,9-
  octahydro-exo-1,4-endo-5,8-dimethanonaphthaline
  [Dieldrin]do, endo-endo [Endrin]
6,7,8,9,10,10-hexachloro-1,5,5α,6,9,9α-hexahydro-6,9-
  methano-2,3,4-benzo[e]-dioxa-thiepen-3-oxide
  [Endosulfan]
Chlorinated camphor [Toxaphen]
Decachloroctahydro-1,3,4-metheno-2H-cyclobuta[e,d]
  pentalene-2-one
Dodecachloroctahydro-1,3,4-metheno-1H-cyclobuta-
  [c,d]pentalene [Mirex]
Ethyl 1,1α,3,3α,4,5,5α,5α,6-decachloroctahydro-2-hy-
  droxy-1,3,4-metheno-1H-cyclobuta[c,d]
  pentalene-2-laevulinate
Bis(pentachlor-2,4-cyclopentadien-1-yl)
Dinoctone-o
1,1,1-trichlor-2,2-bis(p-chlorphenyl)ethane[DDT]
Dichlordiphenyl-dichlorethane[TDE]
Di(p-chlorphenyl)-trichlormethylcarbinol [Dicofol]
Ethyl-4,4'-dichlorophenylglycolate[chlorobenzilate]
Ethyl-4,4'-dibrombenzylate [Brombenzylat]
Isopropyl-4,4'-dichlorbenzylate
1,1,1-trichlor-2,2-bis-(p-methoxyphenyl)ethane
  [Methoxychlor]
Diethyl-diphenyl-dichloroethane
Decachlorpentacyclo(3,3,2,O$^{2,6}$,O$^{3,9}$,O$^{7,10}$)decan-4-one
  [Chlordecon]

Nitrophenols and derivatives 4,6-dinitro,6-methylphenol, Na-salt [Dinitrocresol]
Dinitrobutylphenol 2,2',2''-1 triethanolamine salt
2 cyclohexyl-4,6-Dinitrophenol [Dinex]
2-(1-methylheptyl)-4,6-1 dinitrophenyl-crotonate
  [Dinocap]
2-sec.-butyl-4,6-dinitrophenyl-3-methyl-butenoate
  [Binapacryl]
2 sec.-butyl-4,6-dinitrophenyl-cyclopropionate
2 sec.-butyl-4,6-dinitrophenyl-isopropyl-carbonate
  [Dinobuton]

Various

Sabadilla
Rotenone
Cevadin
Veratridin
Ryania
Pyrethrin
3-allyl-2-methyl-4-oxo-2-cyclopenten-1-yl-chrysan-
  themumate (Allethrin)
6-chlorpiperonyl-chrysanthemumate (barthrin)
2,4-dimethylbenzyl-chrysanthemumate (dimethrin)
2,3,4,5-tetrahydrophthalimidomethylchrysanthemumate
(5-benzyl-3-furyl)-methyl-2,2-dimethyl-3-(2-methyl-
  propanyl)-cyclopropancarboxylate
Nicotine
Bacillus thuringiensis Berliner
Dicyclohexylcarbodiimide
Diphenyldiimide (Azobenzene)
4-Chlorobenzyl-4-chlorphenylsulfide (Chlorbenside)
  creosote oil
6-methyl-2-oxo-1,3-dithiolo-[4,5-b]-quinoxaline
  (Quinomethionate)
(I)-3-(2-furfuryl)-2-methyl-4-oxocyclopent-2-enyl(I)-
  (cis+trans)chrysanthemum monocarboxylate
  (furethrin)
2-pivaloyl-indan-1,3-dione (pindone)
2-fluoroethyl (4-bisphenyl)acetate
2-fluor-N-methyl-N(1-naphthyl)-acetamide-
Pentachlorphenol and salts
2,2,2-trichlor-N-(pentachlorphenyl)-acetimidoyl chloride
N'-(4-chlor-2-methylphenyl)-N,N-dimethylformamidine
  (chlorphenamidin)
4-chlorbenzyl-4-fluorophenyl-sulfide (fluorobenside)
5,6-dichlor-1-phenoxycarbanyl-2-trifluormethyl-benzimid-
  azole (fenazaflor)
Tricyclohexyl tin hydroxide
2-thiocyanatoethyl-lauric acid ester
β-butoxy-β'-thiocyanatodiethylether
Isobornyl-thiocyanatoacetate
p-Chlorphenyl-p-chlorbenzene sulfonate (chlorfenson)
2,4-dichlorophenyl-benzene sulfonate
p-Chlorphenyl-benzene sulfonate (Fenson)
p-Chlorphenyl-2,4,5-trichlorphenylsulfone(Tetradifon)
p-Chlorphenyl-2,4,5-trichlorphenylsulfide(Tetrasul)
Methyl bromide
p-Chlorphenyl-phenylsulfone
p-Chlorbenzyl-p-chlorphenylsulfide(Chlorbenside)
4-chlorphenyl-2,4,5-trichlorphenylazosulfide
2-(p-tert.-butylphenoxy)-1-methylethyl-2-chlorethyl-
  sulfite
2-(p-tert.-butylphenoxy)cyclohexyl-2-propinyl-sulfite
4,4'-dichlor-N-methylbenzolsulfonanilide
N-(2-fluor-1,1,2,2-tetrachloroethylthio)-methansulfon-
  anilide
2-thio-1,3-dithiolo-(4,5,6)quinoxaline(Thioquinox)
Chlormethyl-p-chlorphenylsulfone(lausetonew)
1,3,6,8-tetranitrocarbazole
Prop-2-ynyl-(4-t-butylphenoxy)-cyclohexylsulfite
  (Propargil)

The insecticidal/acaricidal action of the phosphorus compounds according to the invention can be further increased by the use of synergists. For this, the following are suitable, for example, Sesamin, Sesamex, Piperonyl cyclonene, Piperonyl butoxide, Piperonal bis [2-(2-butyoxyethoxy)ethyl]acetate, Sulfoxide, Propyl isome, N-(2 - ethylhexyl) - 5-norbornen-2,3-dicarboxamide, Octachlorodipropylether, 2 - nitrophenyl-propargylether, 4-chlor - 2 - nitrophenylpropargylether, and 2,4,5 - trichlorophenylpropargyl ether.

The phosphorus esters according to the invention can be used in the form of solutions, emulsions, suspensions, granulates or dusting agents. The particular application form will depend on the circumstances of use, but must guarantee satisfactory even spreading of the active substance.

For the manufacture of solutions, the following solvents may be used: alcohols, e.g. ethanol or isopropanol, ketones such as acetone or cyclohexanone, aliphatic hydrocarbons such as kerosene and cyclic hydrocarbons such as benzene, toluene, xylene, tetrahydronaphthalene, alkylated naphthalenes, and chlorinated hydrocarbons such as tetrachloroethane and ethylene chloride, and finally mineral or vegetable oils. Mixtures of the above solvents may be used. For aqueous application forms, these are preferably made up as emulsions or dispersions: The active agents are homogenised in water as such or in one of the above solvents, preferably with the aid of wetting or dispersing agents. As cation active emulsifying or dispersing agents there may be exemplified quaternary ammonium compounds, as anion active, for example soaps, aliphatic long chain sulphuric acid monoesters, aliphatic-aromatic sulphonic acids, long chain alkoxyacetic acids, and as non-ionic, for example, polyglycol ethers of fatty alcohols or ethylene oxide condensation products with p-tert. alkyl phenols. Alternatively, concentrates can be made up of active compound, emulsifying or dispersing agent and optionally solvent. These concentrates can merely be diluted, e.g. with water, when desired for use.

Dusting agents can be made by mixing or grinding together the active compound with a solid carrier material. Suitable materials are, for example, talcum, diatomaceous earth, kaolin, betonite, calcium carbonate, boric acid, tricalcium phosphate and even wood flour, cork flour, coal and other materials of vegetable origin. The active compounds can also be applied to the carrier from a volatile solvent. By the addition of wetting agents and protective colloids, powder preparations and pastes which can be suspended in water and used as a spray can be made.

In many cases the use of granules is advantageous for giving the regular release of compounds over a long time period. These can be made by dissolving the compound in an organic solvent, absorbing the solution into granulated material, e.g. attapulgite or $SiO_2$ and removing the solvent. They can also be made by mixing the phosphoric acid ester of Formula I with polymerisable compounds and then carrying out a polymerisation process in which the active compound remains untouched, and by carrying out granulation during the gel-forming stage of the polymerisation. The content of active substance in the above described agents lies between 0.1 and 95% by weight. It is to be noted that in the case of application from aircraft or with the aid of other suitable application apparatus, concentrations of up to 99.5% by weight or technically pure active compound may be used.

The following examples will serve to illustrate the invention:

EXAMPLE 1

Manufacture of N-bromoethyl-2-bromo-4,5-dichloroimidazole (A) N-hydroxymethyl-2-bromo 4,5-dichloroimidazole 200 g. of 2-bromo-4,5-dichloroimidazole were addded with stirring to 700 g. formaldehyde solution (40%). The suspension was slowly heated to boiling. The reaction mixture was then stirred for 9 hours under reflux and then cooled, sucked off, washed with water and dried in vacuo. 190 g. of N-hydroxymethyl-2-bromo-4,5-dichloroimidazole were obtained. M.Pt. 150° C.

(B) N-bromomethyl-2-bromo-4,5-dichlorimidazole

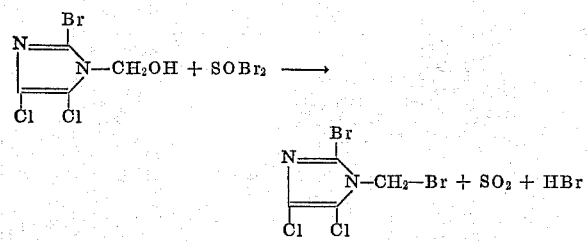

49.2 g. 1-hydroxymethyl-2-bromo-4,5-dichloroimidazole were added to 140 ml. dimethyformamide (dry) at 0° C. 50 g. thionyl bromide was added dropwise over 3 hours with continuous cooling at 0° C., and the mixture then stired for one hour at 0° C. The reaction mixture was then poured into ice water the precipitate sucked off, well washed with water, dried at room temperature and treated further in the crude state.

EXAMPLE 2

Manufacture of O,O-diethyl-S-[2-chloro-4,5-dibromoimidazolyl-methyl-(1)]-dithiophosphate (Compound No. 1)

22.3 g. of diethyl dithiophosphoric acid were dissolved in 100 ml. water with 8.3 g. $K_2CO_3$. A solution of 29.7 g. 1-chloromethyl-2-dichloro-4,5-dibromoimidazole in 50 ml. acetone was then slowly added. The reaction mixture was stirred for 5 hours at 70° C. and after cooling was diluted with 200 ml. benzene and 200 ml. water. The benzene phase was separated washed twice with 100 ml. of 3% $K_2CO_3$ solution and dried over $Na_2SO_4$.

After distilling off the benzene, 35.2 g. of a brown oil remained of the following composition:

$C_7H_{12}Br_2ClN_2O_2PS_2$. Calculated (percent): P, 6.8; Br, 34.8; Cl, 7.7. Found (percent): P, 6.8; Br, 33.9; Cl, 7.5.

In similar fashion the following compounds of Formula VI were prepared:

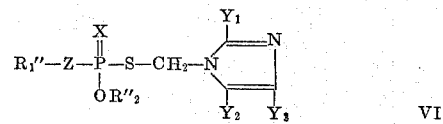

VI

| Compound number | R''₁ | R''₂ | X | Z | Y₁ | Y₂ | Y₃ | Melting point, °C |
|---|---|---|---|---|---|---|---|---|
| 2 | CH₃ | CH₃ | S | O | Cl | Br | Br | 77 |
| 3 | C₂H₅ | C₂H₅ | O | O | Cl | Br | Br | (¹) |
| 4 | CH₃ | CH₃ | O | O | Cl | Br | Br | |
| 5 | CH₃ | CH₃ | S | O | Cl | Cl | Cl | |
| 6 | C₂H₅ | C₂H₅ | S | O | Cl | Cl | Cl | |
| 7 | CH₃ | CH₃ | O | O | Cl | Cl | Cl | |
| 8 | C₂H₅ | C₂H₅ | O | O | Cl | Cl | Cl | |
| 9 | CH₃ | CH₃ | S | O | Br | Br | Br | 75 |
| 10 | C₂H₅ | C₂H₅ | S | O | Br | Br | Br | (¹) |
| 11 | CH₃ | CH₃ | O | O | Br | Br | Br | |
| 12 | C₂H₅ | C₂H₅ | O | O | Br | Br | Br | (¹) |
| 13 | n-C₃H₇ | C₂H₅ | O | S | Br | Cl | Cl | |
| 14 | n-C₃H₇ | C₂H₅ | O | S | Br | Br | Br | (¹) |
| 15 | n-C₃H₇ | C₂H₅ | O | S | Cl | Cl | Cl | |
| 16 | CH₃ | CH₃ | S | O | Br | Cl | Cl | |
| 17 | C₂H₅ | C₂H₅ | S | O | Br | Cl | Cl | |
| 18 | C₂H₅ | C₂H₅ | O | O | Br | Cl | Cl | |

¹ Viscous oil.

In similar fashion the following compounds of Formula VII were prepared:

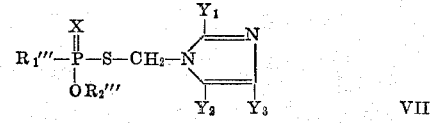

VII

| Compound number | R'''₁ | R'''₂ | X | Y₁ | Y₂ | Y₃ |
|---|---|---|---|---|---|---|
| 19 | CH₃ | CH₃ | S | Cl | Cl | Cl |
| 20 | CH₃ | CH₃ | O | Cl | Cl | Cl |
| 21 | CH₃ | CH₃ | S | Cl | Br | Br |
| 22 | C₂H₅ | C₂H₅ | S | Cl | Br | Br |
| 23 | C₂H₅ | C₂H₅ | S | Br | Cl | Cl |
| 24 | C₂H₅ | C₂H₅ | S | Br | Br | Br |

In similar fashion the following compounds of Formula VIII were prepared

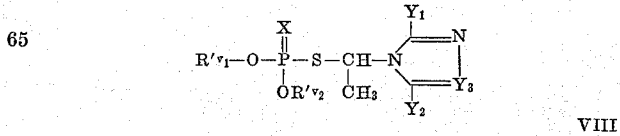

VIII

| Compound number | R'ᵥ₁ | R'ᵥ₂ | X | Y₁ | Y₂ | Y₃ |
|---|---|---|---|---|---|---|
| 25 | C₂H₅ | C₂H₅ | S | Cl | Cl | Cl |
| 26 | C₂H₅ | C₂H₅ | O | Cl | Cl | Cl |
| 27 | C₂H₅ | C₂H₅ | S | Cl | Br | Br |
| 28 | C₂H₅ | C₂H₅ | O | Cl | Br | Br |
| 29 | C₂H₅ | C₂H₅ | S | Br | Br | Br |

EXAMPLE 3

Powder for spraying

For making a water-soluble sprayable powder, the following components were mixed and finely ground:

50 parts active compound og Formula I
20 parts highly absorbent silica
25 parts bolus alba (Kaolin)
1.5 parts 1-benzyl-2-stearyl-benzimidazol-6,3'-disulphonic acid, sodium salt
3.5 parts reaction product of p. tert-octylphenol and ethylene oxide

Emulsion concentrate (a) 40 parts of an active compound according to Formula I were mixed with 10 parts of a mixture of an anionic surface active agent, preferably the calcium or magnesium salt of monolauryl-benzene-monosulphonic acid, and a non-ionic surface active compound, preferably a polyethylene glycol ether of monosorbitol laureate, and the whole dissolved in a little xylene. The mixture was then made up to 100 ml. with xylene and a clear solution resulted which could be used as a sprayable concentrate, and which gives a stable emulsion on being poured into water.

(b) Well soluble compounds of Formula I can also be formulated as an emulsion concentrate according to the following directions:

20 parts active compound
70 parts xylene
10 parts of a mixture of a reaction product of an alkyl phenol with ethylene oxide and calcium dodecylbenzene sulphonate were mixed On thinning with water to the desired concentration, a sprayable emulsion results.

Granulate (a) 7.5 g. of an active compound of Formula I was dissolved in 10 ml. acetone and the so-obtained acetonic solution added to 92 g. granulated attapulgite. The whole was well mixed and the solvent removed in a rotary drier. A granulate of 7.5% active agent content was obtained.

(b) For the manufacture of a 10% polymeric granulate, 1050 to 1100 g. of a technical compound of Formula I was dissolved in 2 litres of trichlorethylene and sprayed in a cyclone granulator at 1.5 atmospheres pressure, onto 9230 g. preprepared porous urea/HCHO granulate. On heating the cyclone air to about 50° C., the solvent could be removed.

(c) For making a 7.5% loaded granulate, 770 g. of a solid technical compound of Formula I, 500 g. $BaSO_4$, 1000 g. urea and 7730 g. powdered, porous polyacrylonitrile was pressed together on a roll mill and then broken down to the desired granule size.

EXAMPLE 4

Action against spidermites

Bush bean plants (*Phaseolus vulgaris*) in the two leaf stage were infected 12 hours before treatment with active compound with spidermites by the application of pieces of leaf from a culture which had been attacked, so that after such time a population in all stages of development was present on the plants. With the aid of a chromatography atomiser the plants were then sprayed with the emulsified active agent, until an even layer of droplets was present on the leaf surface. Evaluations were effected after 2 and 7 days: the plant parts were inspected under a stereo-microscope for determining the percentage kill. With this test arrangement, no effect on eggs was evident after 2 days, because under the conditions given, embryonic development lasts 4 days. If after 2 days 100% kill of larvae and adults was observed, the plants were re-infected.

In the following tables, the kill percentages for normally sensitive *Tetranychus urticae* Koch and for phosphoric acid ester tolerant *Tetranychus cinnabarinus* are given.

TABLE

Compound Number 1.—(a) Action against *Tetr. urticae*

| Concentration p.p.m. | Kill— | | | | |
|---|---|---|---|---|---|
| | After 2 days | | After 7 days | | |
| | Larvae | Adults | Eggs | Larvae | Adults |
| 800 | 100 | 100 | 80 | 100 | 100 |
| 400 | 100 | 100 | 80 | 80 | 100 |
| 200 | 100 | 100 | 60 | 60 | 100 |
| 100 | 80 | 60 | 0 | 0 | 60 |

(b) Action against *Tetr. cinnabarinus*

| Concentration p.p.m. | Larvae | Adults | Eggs | Larvae | Adults |
|---|---|---|---|---|---|
| 800 | 100 | 100 | 80 | 100 | 100 |
| 400 | 100 | 100 | 80 | 80 | 100 |
| 200 | 100 | 100 | 60 | 60 | 100 |
| 100 | 80 | 60 | 0 | 0 | 60 |

Compound number 2.—(a) Action against *Tetr. urticae*

| Concentration p.p.m. | Kill— | | | | |
|---|---|---|---|---|---|
| | After 2 days | | After 7 days | | |
| | Larvae | Adults | Eggs | Larvae | Adults |
| 800 | 100 | 100 | | 100 | 100 |
| 400 | 100 | 100 | | 100 | 100 |
| 200 | 100 | 100 | | 100 | 100 |
| 100 | 100 | 100 | | 100 | 100 |

(b) Action against *Tetr. cinnabarinus*

| Concentration p.p.m. | Larvae | Adults | Eggs | Larvae | Adults |
|---|---|---|---|---|---|
| 800 | 100 | 100 | | 100 | 100 |
| 400 | 100 | 100 | | 100 | 100 |
| 200 | 100 | 100 | | 100 | 100 |
| 100 | 100 | 100 | | 100 | 100 |

EXAMPLE 5

Action against *Aphis fabae*

Young *Vicia faba* plants about 6 cm. high were infested with plant parts attacked by *Aphis fabae*. After 5 days of further growth of the plants and correspondingly great increase of the aphids, the starting conditions for the active compound test were set up. The infested plants were sprayed from all sides with emulsions of compounds Nos. 2 and 3 (contact effect). If 100% kill was observed after 2 days, the plants were re-infested.

With compounds 2 and 3, after 2 and 5 days the following percentage kills were observed.

| Compound number | Concentration, p.p.m. | Contact action of— | |
|---|---|---|---|
| | | 2 days | 5 days |
| 2 | 800 | 100 | 100 |
| | 400 | 100 | 100 |
| | 200 | 100 | 80 |
| | 100 | 100 | 0 |
| 3 | 800 | 100 | 0 |
| | 400 | 100 | 0 |
| | 200 | 100 | 0 |
| | 100 | 100 | 0 |

EXAMPLE 6

Action against *Epilachna varivestis*

The test with *Epilachna varivestis*, the Mexican bean weevil was carried out as follows:

4–5 seedlings of *Phaseolus vulgaris* in the first leaf stage were put in a flower pot, dipped in an emulsion of the test preparation and then allowed to dry. The test animals (L-4 stage) were introduced into a cellophane bag which was then inverted over the treated plants and closed with a rubber band. After 5 days the effect of the treatment was determined by counting the living and dead animals and calculating the perecentage death rate.

With compounds 1, 2 and 3, the following death rates (in percent) were determined:

| Compound number | Concentration, p.p.m. | 5 days |
|---|---|---|
| 1 | 800 | 100 |
|   | 400 | 100 |
|   | 200 | 100 |
|   | 100 | 60 |
| 2 | 800 | 100 |
|   | 400 | 100 |
|   | 200 | 80 |
|   | 100 | 80 |
| 3 | 800 | 100 |
|   | 400 | 100 |
|   | 200 | 100 |
|   | 100 | 80 |

EXAMPLE 7

The action of compounds Nos. 1 and 3 against ectoparasites and carriers in p.p.m. minimum concentration for full kill (LC 100).

(A) *Rhipicephalus bursa* (adults). The test animals were treated briefly with aqueous solutions from a dilution row of the active compound. Evaluation after 2 weeks.

(B) *Rhipicephalus bursa* (larvae). Method as under A. Evaluation at 3 days.

(C) *Boophilus microplus* (larvae). Method as under A. Evaluation at 3 days.

(D) *Aedes Aegypti* (larvae). The larvae of yellow fever mosquitoes were kept in a very dilute aqueous solution of active agent. Evaluation after 24 hours.

Minimum concentration of full kill:

| Compound number | Parts per milion of— | | | |
|---|---|---|---|---|
|   | A | B | C | D |
| 1 | 1 | 5 | 1 | 0.025 |
| 3 | 10 | 100 | 10 | >1 |

EXAMPLE 8

Compound No. 1 was tested at a dust against the following stored product and household pests: *Blatella germanica, Periplaneta americana; Blatta orientalis; Tenebrio molitor* imago; *Tenebrio molitor* larve; *Dermestes frischii* imago; *Dermestes frischii* larve; *Attagenus piceus* larve; *Acheta domestica; Sitophilus granarius*.

5 parts by weight active compound and 5 parts by weight talcum were mixed and finely ground. By mixing in another 90 parts by weight talcum, a 5% dusting powder was obtained, which could be used as a starting mixture for a dilution row of the corresponding compound for testing against stored product pests.

Test animals were put in glass dishes on filter paper which had been treated with 2 g. of the 5% formulation. The active compound concentration thereon was 100 mg. active substance/m.$^2$.

By further 1:1 dilutions of 5% dusting powder, dilutions of 2.5%, 1.25%, 0.62%, 0.3%, 0.16% and 0.08% were obtained, corresponding to an amount of active compound of 50, 25, 12.5, 6.2, 3.1 and 1.5 mg. active compound/m.$^2$ when 2 gm. of the dusting formulation was used per glass dish.

Evaluation took place after 24 hours. In the present case, the following minimum effective concentrations for full kill of the pests were determined:

[Minimum amount of active compound which effects 100% kill on 24 hours exposure time active compound per m.$^2$]

| Test animal type | Compound number 1 |
|---|---|
| German cockroach (*Blattella germanica*) | 25 |
| American cockroach (*Periplaneta americana*) | 100 |
| Oriental cockroach (*Blatta orientalis*) | 100 |
| Yellow mealworm beetle (*Tenebrio molitor*): | |
| Imago | 50 |
| Larva | 100 |
| Bacon beetle (*Dermestes frischii*): | |
| Imago | >100 |
| Larva | 100 |
| Beetle (*Attagenus piceus*), larva | >100 |
| House cricket (*Acheta domestica*), larva | 50 |
| Grain weevil (*Sitophilus granarius*), imago | 50 |

EXAMPLE 9

Young oats plants (type: Flaming crown) were reared in a greenhouse. When leaf length was about 10 cm., the plants were sprayed with a 10% wettable powder containing 0.01% of active compound No. 3, until the leaves were dripping wet. After drying the sprayed layer they were evenly sprayed with a suspension of uredospores of the mould *Puccinia coronata* (oat ear rust). They were then kept for 5 days at 20–22° C. and 90% relative humidity and then kept at normal relative humidity. Evaluation was after 12 days. The untreated control showed 100% infection while the treated plants were infected to only 3–6%.

We claim:

1. A compound of the formula

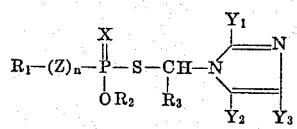

wherein $R_1$ and $R_2$ are each alkyl of 1 to 4 carbon atoms
$n$ is 0 or 1
X and Z are each oxygen or sulphur
$R_3$ is hydrogen or methyl, and
$Y_1$, $Y_2$ and $Y_3$ are each chlorine or bromine.

2. A compound according to claim 1 wherein $R_1$ and $R_2$ are each methyl, ethyl, n-propyl or isopropyl, $R_3$ is hydrogen, $Y_1$ is chlorine or bromine and $Y_2$ and $Y_3$ represent chlorine or bromine and are identical.

3. The compound according to claim 1 of the formula

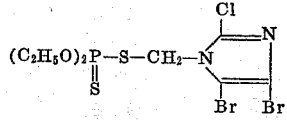

4. The compound according to claim 1 of the formula

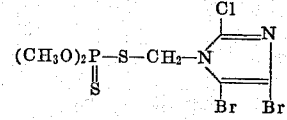

5. The compound according to claim 1 of the formula

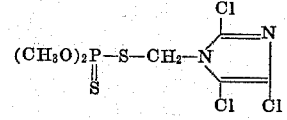

6. The compound according to claim 1 of the formula

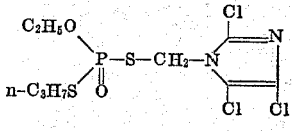

7. The compound according to claim 1 of the formula
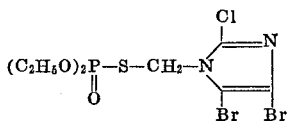
8. The compound according to claim 1 of the formula
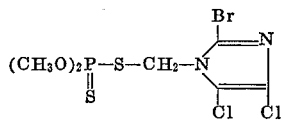
9. The compound according to claim 1 of the formula
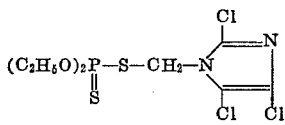
References Cited
UNITED STATES PATENTS
| | | | |
|---|---|---|---|
| 3,185,699 | 5/1965 | Sherlock | 260—309 |
| 3,409,606 | 11/1968 | Lutz et al. | 260—309 |
| 3,423,420 | 1/1969 | Büchel et al. | 260—309 |
| 3,435,050 | 3/1969 | Wasco | 260—309 |
FOREIGN PATENTS
| | | | |
|---|---|---|---|
| 1,485,394 | 5/1967 | France | 260—309 |
OTHER REFERENCES
Geigy Chem. Abstr., vol. 62, column 13154 (1965).
NATALIE TROUSOF, Primary Examiner
U.S. Cl. X.R.
424—273